Fig. 1

Jan. 7, 1936.  L. S. CHADWICK ET AL  2,026,866
THERMOSTATICALLY ADJUSTED DRAFT REGULATOR
Filed July 3, 1934  6 Sheets-Sheet 5

INVENTORS,
Lee S. Chadwick
Marc Resek and
John A. Dahlstrom
BY
Hull, Brock & West,
ATTORNEYS.

Jan. 7, 1936.   L. S. CHADWICK ET AL   2,026,866
THERMOSTATICALLY ADJUSTED DRAFT REGULATOR
Filed July 3, 1934   6 Sheets-Sheet 6

INVENTORS,
Lee S. Chadwick
Marc Reech and
John A. Dahlstrom
BY
Hull, Brock & West
ATTORNEYS.

Patented Jan. 7, 1936

2,026,866

UNITED STATES PATENT OFFICE 2,026,866

THERMOSTATICALLY ADJUSTED DRAFT REGULATOR

Lee S. Chadwick, Shaker Heights Village, Marc Resek, Cleveland Heights, and John A. Dahlstrom, Bay Village, Ohio, assignors to Perfection Stove Company, Cleveland, Ohio, a corporation of Ohio Application July 3, 1934, Serial No. 733,616

20 Claims. (Cl. 236—45)

This invention relates to improvements in draft regulators of the kind used in connection with combustion apparatus, such as furnaces, for admitting atmospheric air to the flue, and which comprise a movable valve member that controls the admission of air through an opening in the flue and is biased toward closed position and opens in response to a chimney draft exceeding a given value. It is customary in such regulators to employ an adjustment that may be manually set to maintain a substantially constant draft of the desired pressure through the combustion chamber, notwithstanding variations in chimney suction due to different chimney temperatures and outside wind conditions.

Our invention is especially adapted for use with combustion apparatus or furnaces of the kind in which fuel oil is burned in a firepot or burner bowl, as in the type of furnace herein illustrated; and with such apparatus it is found that the best results are obtained by having a low chimney draft at low fire and a higher draft at high fire, regulated, of course, to compensate for variations in chimney temperatures and outside atmospheric conditions and wind velocity, as above pointed out. Otherwise, the natural chimney draft, which increases as the chimney heats up, would suffice. Furthermore, it is found advantageous to increase the draft more rapidly between low and medium fires, relative to the temperature increment of the products of combustion, than between medium and high fires.

Broadly, it is the purpose of the invention to provide a draft regulator that will function automatically to effect these desirable results; and, more limited'y, the invention has for further objects the provision of an efficient and reliable automatic draft regulator that is simple and comparatively inexpensive, is durable and is not likely to get out of order, and whose action is a modification of that of prevailing draft regulators in that the draft increases as the temperature of the flue gases rises, preferably at a gradually diminishing rate of speed.

To these ends, our improved draft regulator incorporates a thermostat that is subjected to the temperature of the flue gases and which functions to increase the opening resistance of the valve member of the regulator as the temperature rises, desirably at a gradually diminishing rate with respect to the temperature increment.

Objects and advantages additional to those above enumerated, and pertaining more to structural refinements, will appear as we proceed to describe the invention in detail with reference to the accompanying drawings.

Figure 1:
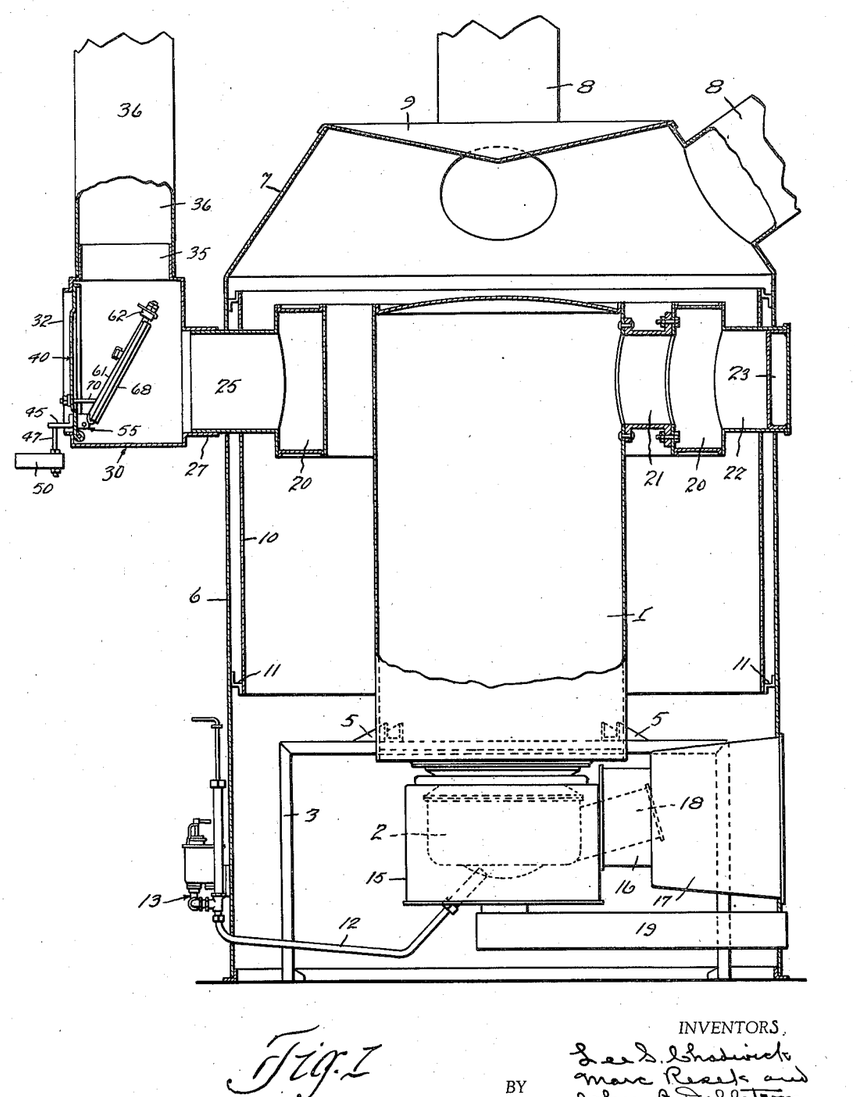
Fig. 1 is a sectional side elevation of an oil burning hot air furnace equipped with our improved draft regulator.

The invention is illustrated in connection with an oil burning hot air furnace because of its peculiar suitability to a combustion apparatus of this character, as hereinbefore stated; but it is to be understood that the invention is not limited to such an association. The furnace comprises a combustion chamber 1, a burner that is designated generally by the reference numeral 2 and consists of a firepot or burner bowl, a frame 3 by which the combustion chamber is supported through means of brackets 5, and a jacket 6 that encloses the foregoing parts. Following common practice, this jacket is of sheet metal and it is shown as including the usual upwardly converging wall 7, from which the heat distributing pipes 8 extend, and which is surmounted by a shallow inverted conical top 9. Throughout approximately the vertical extent of the combustion chamber 1, the jacket 6 has a liner 10 that is supported and spaced from the jacket by members 11.

The burner 2 is of the same type as that disclosed in Letters Patent No. 1,944,593, dated January 23, 1934. The burner is supplied with oil from a suitable source through a supply line of which the conduit designated 12 is a part and the same includes a metering valve and liquid level control device 13 which may be of any approved construction. The burner 2 is housed within a drum 15 that connects, through a sleeve 16, with a casing 17 that opens through the front of the jacket 6 and provides access to the lighting and cleanout opening of the burner that is indicated in dotted lines at 18. Air is supplied to the burner through a duct 19 that opens through the front of the jacket 6 below the casing 17.

Surrounding and spaced radially from the top portion of the combustion chamber 1 is an annular radiator 20. This radiator communicates with the combustion chamber adjacent the front of the structure through a duct 21, in alignment with which a tubular extension 22 projects forwardly from the radiator through aligned openings in the jacket 6 and lining 10 and whose front end is normally closed by a removable plug 23. Projecting from the rear side of the radiator 20 is a tubular outlet extension 25 that passes through aligned openings in the lining 10 and jacket 6. Applied to the rear end of the extension 25 is a collar 27 that extends forwardly from the front wall of a casing 30 that constitutes a part of our improved automatic draft regulator. According to the present embodiment of the invention, the casing 30 is a rectangular, box-like structure whose rear wall 31 is provided with an opening 32, shown as surrounded by a flange 33, and the top wall 34 is fitted with a collar 35 to which is applied a pipe 36 that comprises the flue or chimney for carrying off the products of combustion.

Figure 2:
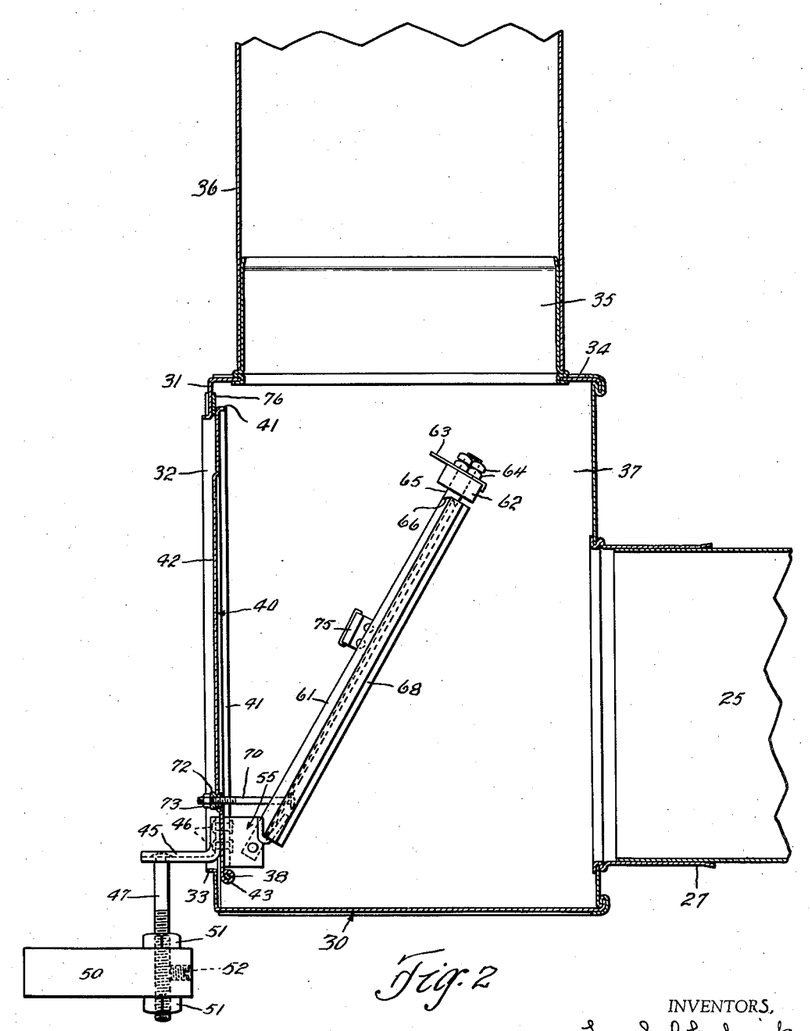
Fig. 2 is a central vertical section through the draft regulator of our invention showing the thermostat assembly in the position it occupies with respect to the valve member when unaffected by the temperature of the flue gases.

Supported by and between the side walls 37 of the casing 30, immediately inside of the rear wall 31 and adjacent, and parallel with, the lower edge of the opening 32, is a shaft or pintle 38 that carries a valve member 40 in the form of a rectangular plate, flanged along its lateral and top edges, as indicated at 41, and depressed at 42 throughout its central region. The lower edge portion of the valve member is formed to provide a sleeve 43 that encircles the shaft or pintle 38.

The base portion of an L-shaped bracket 45 is shown as connected to the valve member 40 at the transverse center and near the lower edge thereof, as by fastening means or rivets 46, and rigidly connected to and depending from the outer end of the bracket is an arm 47 that is threaded a material distance upwardly from its lower end and has applied to it a weight 50, and nuts 51 between which the weight is clamped. The weight, shown as cylindrical and as having the hole therein that receives the arm 47 considerably off center, may be swung about said arm and held in any angular position thereon by a set screw 52.

The structure so far described, excepting for details, will be recognized as a draft regulator of well known character. The valve member 40 is biased toward closed position by the weight 50 and in the absence of a chimney suction of an appreciable value, the valve member will be retained in closed position by said weight. Any upward draft through the flue, in excess of that required to draw air through the combustion chamber at a rate to promote satisfactory combustion, acts to create a vacuous condition within the casing 30 that results in the valve member being opened by external pressure in opposition to the weight 50. Obviously the draft through the combustion chamber may be varied by adjusting the weight 50 and, in the present case, this may be accomplished by retracting the set screw 52, relaxing the nuts 51, swinging the weight about the arm 47 to the desired position and relocking the weight by the set screw 52 and the clamping nuts 51.

Figure 3:
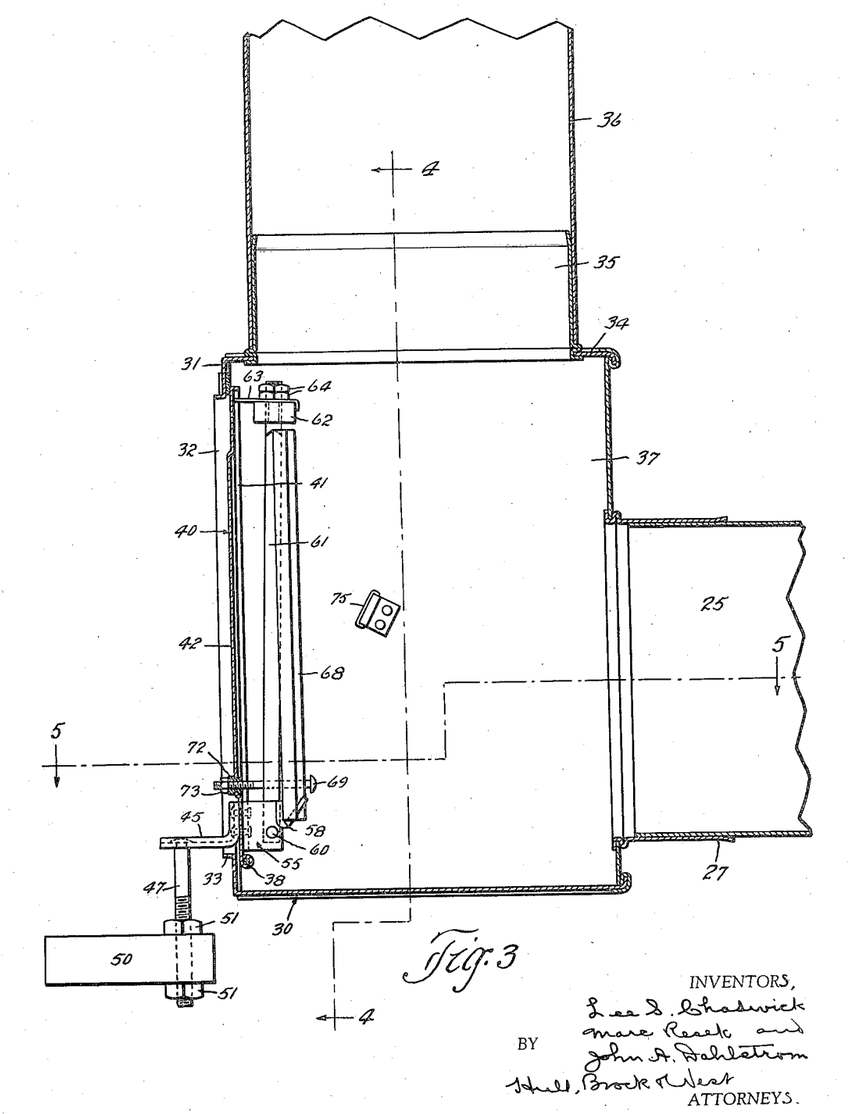
Fig. 3 is a similar view showing the position the thermostat assembly occupies relative to the valve member at high temperature.
Figure 4:
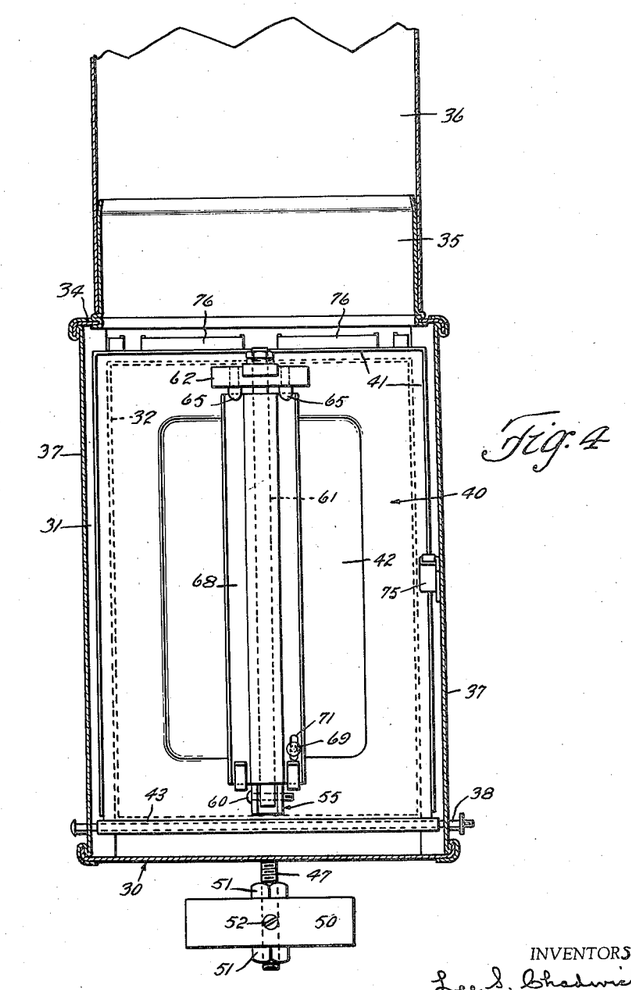
Figs. 4 and 5 are sections through the regulator on the respective lines 4—4 and 5—5 of Fig. 3.
Figure 5:
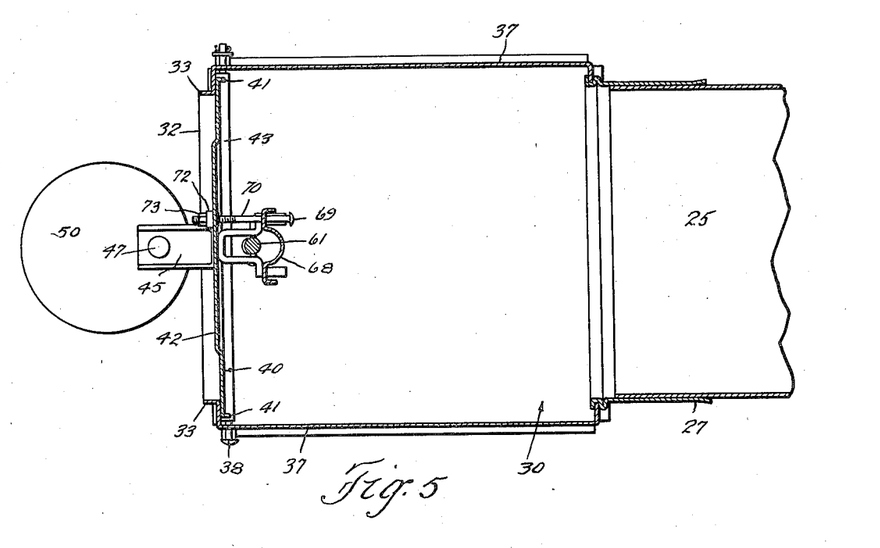
Figures 6, 7, 8:
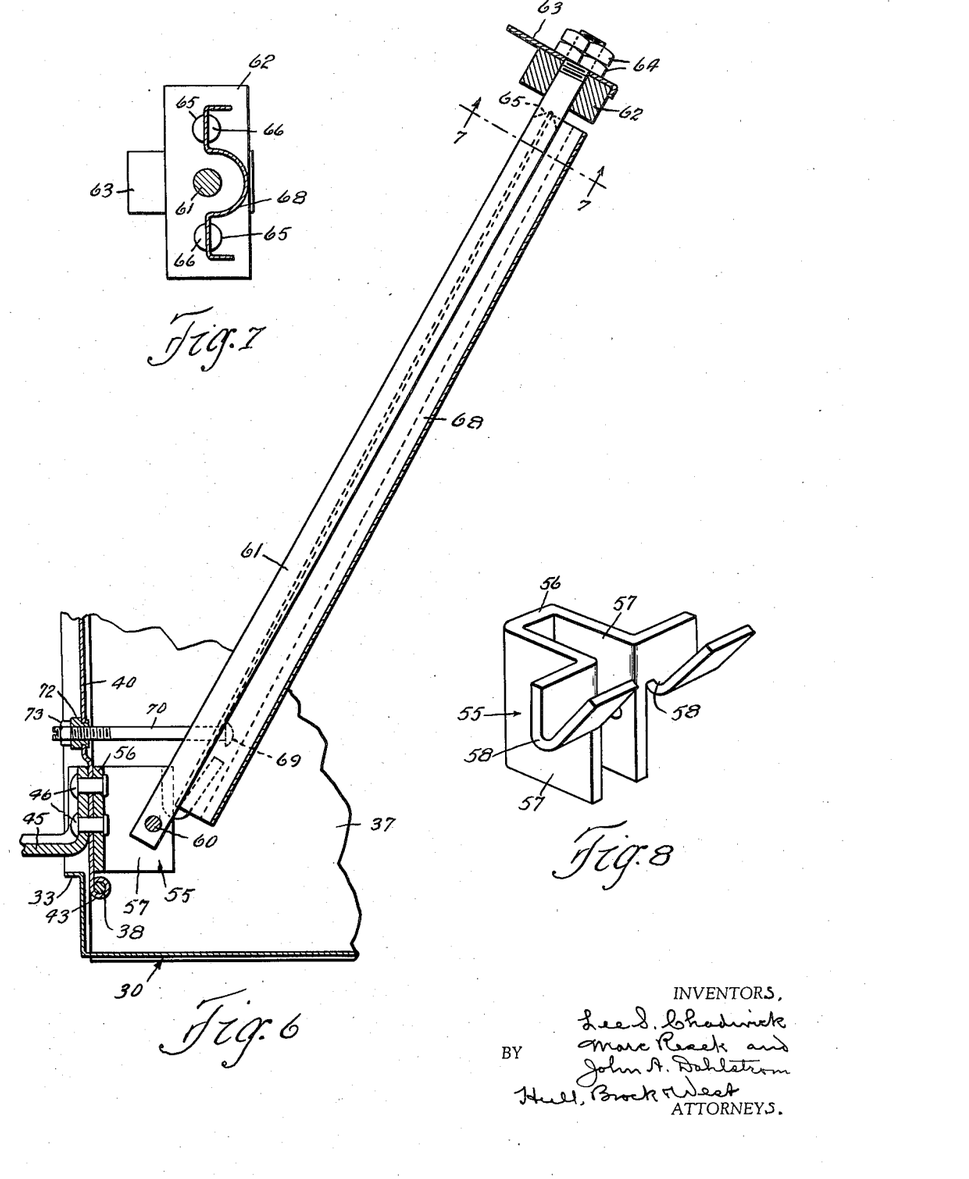
Fig. 6 is an enlarged sectional detail of the thermostat assembly and the parts of the regulator adjacent its pivotal connection with the valve member.
Fig. 7 is a section on the line 7—7 of Fig. 6.
Fig. 8 is a perspective view of the support for the thermostat assembly, and Fig. 9 a similar view of the thermo-sensitive element of the assembly.
Figure 9:
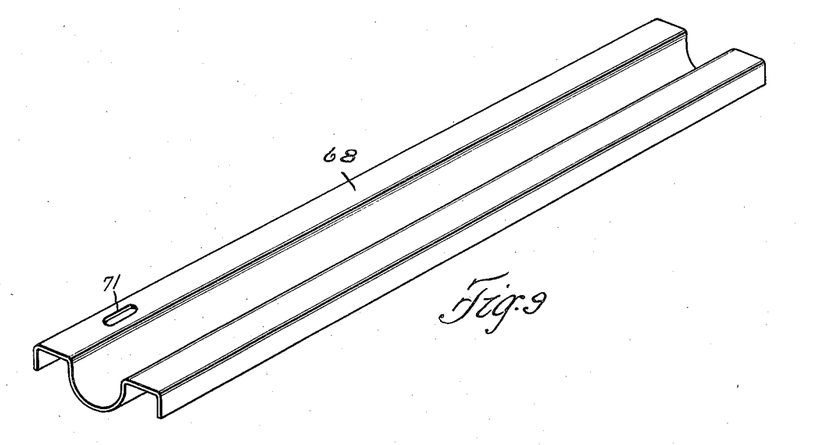

We will now describe the thermostat assembly that is carried by the valve member 40. This assembly tends to counterbalance the weight 50, and its effect upon the valve member is that of increasing the latter's opening resistance as the temperature of the products of combustion increases. Attached to the inner side of the valve member 40, preferably by the same fastening means 46 that secure the bracket 45 to the outer side of said member, is a support 55, shown in perspective in Fig. 8. This support comprises a base 56, side plates 57 and bearings 58. Pivoted upon a pin 60 that is supported by and between the side plates 57 of the support 55 is a rod 61 to the upper end of which is attached a weight in the form of a cross head 62. Said head is surmounted by a stop 63 that is held in place by nuts 64 that are threaded on the end of the rod 61. The stop 63 is arranged to engage the upper end of the valve member 40 and limit the swinging movement of the thermostat assembly in a direction toward said member, as clearly shown in Fig. 3. Depending from the cross head 62, on opposite sides of and in alignment with the rod 61, are studs 65 having V-notches 66 in their lower ends. 68 is a thermo-sensitive element, having the cross-sectional shape shown in Figs. 5, 7, and 9, the same being formed of a plate of suitable metal having a high coefficient of expansion. This element 68 has its upper and lower ends fulcrumed, respectively, in the V-notches of the studs 65 and in the bearings 58 of the support 55.

A stop is provided for limiting the swinging movement of the thermostat assembly in a direction away from the valve member 40 by an abutment or head 69 on a pin 70 whose body portion is extended through a slot 71 in the element 68 and whose end remote from the abutment or head is threaded through a tapped bore of a bushing 72 that is shown as riveted within an opening of the valve member and beyond which the pin has applied to it a lock nut 73. The end of the pin is shown as grooved for the reception of a screw driver or other implement by which it may be conveniently turned to adjust the normal position of the thermostat assembly.

Inward movement of the valve member 40 is arrested by a stop 75 that is carried by one of the side walls 37 of the casing 30. It may be explained that this stop incorporates a cushion of suitable material that serves to deaden the sound of the impact of the valve member; and a pad 76, serving a like purpose, is carried by the wall 31 adjacent the edge of the opening 32 for receiving the valve member when it moves to closed position.

The movable parts of the draft regulator are shown, in Figs. 1 and 2, in the positions they occupy when the thermostat is "cold", so to speak, or, in other words, when it is unaffected by the temperature of the flue gases, and when there is insufficient chimney draft to open the valve member 40. When a fire is started in the burner 2, the products rise in the combustion chamber 1 and escape through the duct 21, radiator 20, duct 25, casing 30 and flue 36. As hereinbefore pointed out, it is desirable to have a relatively low draft through the combustion apparatus at low fire; and assuming that the fire is in this condition because the metering valve included in the device 13 is adjusted to feed the oil slowly, the temperature of the products as they reach the casing 30 will be relatively low and have little effect upon the thermo-sensitive element 68. Consequently, the thermostat assembly will be at substantially the limit of its movement away from the valve member 40 and exert its major counterbalancing influence upon the weight 50, thus minimizing the effect of the weight and allowing the valve member 40 to open under less pressure than it otherwise would. Consequently any upward draft through the flue in excess of that which is desirable through the combustion chamber at low fire will cause the valve member 40 to open sufficiently to admit enough air to satisfy such excess draft. Upon the metering valve being further opened and more oil admitted to the burner, a higher fire will result and the temperature of the products reaching the casing 30 will increase, causing expansion of the thermo-sensitive element 68, and as said element lengthens it will swing the thermostat assembly in a direction toward the valve member 40. This occurs because of the fact that the bearings 58 of the support 55, in which the lower end of the thermo-sensitive element is fulcrumed, are out of alignment with the pivotal support of the rod 61 and the bearing of the upper end of said element in the V-notches of the studs 65, the offset from alignment being in a direction away from the valve member. Further, by reason of the relation of the three pivotal axes of the thermostat assembly (i. e. the pin 60, bearings 58 and V-notches 66), the first part of the swinging movement of said assembly will be somewhat more rapid than the latter part wherefore the counterbalancing effect of the thermostat assembly will gradually diminish with respect to the temperature increment responsible for the continued expansion of the thermo-sensitive element 68. This is desirable, as hereinbefore pointed out, because it will result in the chimney draft increasing at a lower rate of speed as the fire increases from what may be termed a medium stage to that of high fire.

Having thus described our invention, what we claim is:

1. In combination with the flue of a combustion apparatus having an opening for admitting air, a movable valve member for controlling the admission of air through said opening, and means controlling the action of said member, the same tending to maintain the valve member closed in opposition to the flue draft and including a thermostat subjected to the temperature of the gases passing through the flue and acting to increase the opening resistance of the valve member under the influence of a rising temperature.

2. In combination with the flue of a combustion apparatus having an opening for admitting air, a movable valve member for controlling the admission of air through said opening, and means controlling the action of said member, the same tending to maintain the valve member closed in opposition to the flue draft and including a thermostat subjected to the temperature of the gases passing through the flue and acting to increase the opening resistance of the valve member at a gradually diminishing rate under the influence of a rising temperature.

3. In combination with the flue of a combustion apparatus having an opening for admitting air, a movable valve member for controlling the admission of air through said opening, the same being biased toward closed position and opening in response to the flue draft, and a thermostat subjected to the temperature of the products of combustion passing through the flue for varying the opening resistance of said valve member.

4. In combination with the flue of a combustion apparatus having an opening for admitting air, a valve member controlling the admission of air through said opening, the same being pivotally supported off center and biased toward closed position and opening in response to the flue draft, and a thermostat carried by the inner side of said valve member where it is subjected to the products of combustion passing through the flue for varying the opening resistance of the member.

5. In combination with the flue of a combustion apparatus having an opening for admitting air, a valve member pivotally supported off center and controlling the admission of air through said opening, a weight tending to maintain the valve member in closed position, said member opening in response to the flue draft, a thermostat assembly carried by the valve member and subjected to the temperature of the products of combustion passing through the flue, the same constituting a weight that tends to counteract the effect of the former weight and whose counteracting influence is caused to diminish by a rising temperature.

6. In combination with the flue of a combustion apparatus having an opening for admitting air, a valve member pivotally supported off center and controlling the admission of air through said opening, a weight tending to maintain the valve member in closed position, said member opening in response to the flue draft, a thermostat assembly carried by the valve member and subjected to the temperature of the products of combustion passing through the flue, the same constituting a weight that tends to counteract the effect of the former weight and whose counteracting influence is caused to diminish at a gradually decreasing rate by a rising temperature.

7. In combination with the flue of a combustion apparatus having an opening for admitting air, a pivoted valve member for controlling the admission of air through said opening and weighted so as to tend to remain closed in opposition to the flue draft, and thermostatic means subjected to the temperature of the flue gases and functioning to shift the center of gravity of the valve member thereby to increase its opening resistance as the temperature rises.

8. In combination with the flue of a combustion apparatus having an opening for admitting air, a pivotally supported unit comprising a valve member for controlling the admission of air through said opening and weighted so as to tend to remain closed in opposition to the flue draft, and thermostatic means subjected to the temperature of the flue gases and functioning under the influence of a rise in temperature to shift the center of gravity of said unit thereby to increase the opening resistance of the valve member at a gradually diminishing rate with respect to the temperature increase.

9. A draft regulator comprising a casing having an opening, a valve member pivotally supported adjacent the opening for controlling the admission of air therethrough, a weight operatively connected to said member and tending to retain the same closed against inward air pressure, a second weight operatively connected to the valve member and tending to counterbalance the former weight, and a thermostat arranged to be subjected to the temperature of the flue gases for shifting the second weight and thus vary its counterbalancing effect upon the first weight.

10. A draft regulator comprising a casing having an opening, a valve member pivotally supported adjacent said opening for controlling the admission of air therethrough, a weight connected to the valve member on one side of its pivotal axis and tending to retain the same closed against inward air pressure, a second weight connected to the valve member on the other side of its pivotal axis and tending to counterbalance the first mentioned weight, and a thermostat in the casing for shifting the second weight toward and from the vertical plane of the said pivotal axis.

11. A draft regulator comprising a casing having an opening, an inwardly opening pivoted valve member for controlling the admission of air through said opening, a weight attached to the outer side of said member and tending to retain the same closed against inward air pressure, a second weight movably attached to the inner side of the valve member and tending to counterbalance the first mentioned weight, and a thermostat inside the casing arranged to be subjected to the temperature of the flue gases and acting in response to a rising temperature to shift the second weight in a direction to lessen its counterbalancing effect and in response to a lowering temperature to shift the weight in the opposite direction.

12. A draft regulator comprising a casing having an opening, a valve member pivotally supported adjacent said opening for controlling the admission of air therethrough, a weight operatively connected to said member and tending to close the same, and a thermostat assembly subjected to the temperature of the flue gases and tending to counterbalance the weight, the same moving under the influence of a rising temperature in a directon to lessen its counterbalancing effect.

13. A draft regulator comprising a casing having an opening, a valve member pivotally supported adjacent said opening for controlling the admission of air therethrough, a weight operatively connected to said member and tending to close the same, and a thermostat assembly carried by the member and subjected to the temperature of the flue gases and tending to counterbalance the weight, the same being so arranged as to move in a direction to reduce its counterbalancing effect upon the weight under the influence of a rising temperature.

14. A draft regulator comprising a casing having an opening, a valve member pivotally supported adjacent said opening for controlling the admission of air therethrough, a weight operatively connected to said member and tending to close the same, a thermostat assembly attached to the inner side of the valve member where it will be subjected to the temperature of the flue gases, the same normally standing in a given spaced relation to the member where it exerts the maximum counterbalancing effect upon the aforesaid weight, said assembly being so affected by a rise in temperature of the flue gases as to move toward the valve member and thus reduce its counterbalancing effect upon the weight.

15. A draft regulator comprising a casing having an opening, a valve member pivotally supported on a substantially horizontal axis adjacent said opening, a weight operatively connected to said valve member and tending to close the same, the member opening inwardly in response to the chimney draft, a support attached to the inner side of the valve member adjacent its pivotal axis, a rod pivoted at its lower end to said support, said rod having a bearing adjacent its upper end and the support having a bearing inwardly of the pivotal axis of the rod, and a thermo-sensitive element disposed between said bearings and serving when expanded under the influence of a rising temperature to swing the rod toward the valve member.

16. A draft regulator comprising a casing having an opening, a valve member pivotally supported at its lower edge adjacent the corresponding side of said opening, a weight operatively connected to the valve member and tending to close the same, said valve member opening in opposition to said weight in response to the chimney draft, and a thermostat assembly carried by the inner side of the valve member and connected thereto in the region of its pivotal support and extending upwardly and normally inwardly in a position to exert its maximum counterbalancing effect upon the aforesaid weight, the said assembly swinging toward the valve member under the influence of a rising temperature.

17. A draft regulator comprising a casing having an opening, a valve member pivotally supported at its lower edge adjacent the corresponding side of said opening, a weight operatively connected to the valve member and tending to close the same, said valve member opening in opposition to said weight in response to the chimney draft, a member carried by the inner side of the valve member in the region of its pivotal support, a rod having its lower end pivoted to said support, the support incorporating bearings spaced inwardly from the pivotal axis of said rod, a head applied to the upper end of the rod, the same being provided with a bearing contiguous to the transverse axis of the rod, and a thermo-sensitive element interposed between said bearings and serving when expanded under the influence of the temperature of the flue gases to swing the upper end of said rod toward the valve member.

18. A draft regulator comprising a casing having an opening, a valve member pivoted at its lower edge adjacent the corresponding side of said opening, a weight operatively connected to said valve member and tending to close the same, the valve member opening in opposition to said weight in response to the chimney draft, a support connected to the inner side of the valve member in the region of its pivotal axis, a rod having its lower end pivotally connected to said support on a transverse axis, said support incorporating a bearing whose axis is substantially parallel to that of the rod and is spaced inwardly thereof, a cross head carried by the upper end of the rod, bearings supported by the cross head on opposite sides of and in substantially transverse alignment with the rod, and a thermostatic element having its lower end fulcrumed in the bearing of the support and its opposite end engaged within the bearings carried by the cross head and serving when expanded under the influence of a rising temperature of the flue gases to swing the rod toward the valve member.

19. A draft regulator comprising a casing having an opening, a valve member pivoted at its lower edge adjacent the corresponding side of said opening, a weight operatively connected to said valve member and tending to close the same, the valve member opening in opposition to said weight in response to the chimney draft, a support connected to the inner side of the valve member in the region of its pivotal axis, a rod having its lower end pivotally connected to said support on a transverse axis, said support incorporating a bearing whose axis is substantially parallel to that of the rod and is spaced inwardly thereof, a cross head carried by the upper end of the rod, bearings supported by the cross head on opposite sides of and in substantially transverse alignment with the rod, a thermo-sensitive element having its lower end fulcrumed in the bearing of the support and its opposite end engaged within the bearings carried by the cross head and serving when expanded under the influence of a rising temperature of the flue gases to swing the rod toward the valve member, and a stop carried by the upper end of the rod for engagement with the corresponding end of the valve member.

20. A draft regulator comprising a casing having an opening, a valve member pivoted at its lower edge adjacent the corresponding side of said opening, a weight operatively connected to said valve member and tending to close the same, the valve member opening in opposition to said weight in response to the chimney draft, a thermostat assembly comprising a support connected to the inner side of the valve member in the region of its pivotal axis, a rod having its lower end pivotally connected to said support on a transverse axis, said support incorporating a bearing whose axis is substantially parallel to that of the rod and is spaced inwardly thereof, a cross head carried by the upper end of the rod, bearings supported by the cross head on opposite sides of and in substantially transverse alignment with the rod, a thermo-sensitive element having its lower end fulcrumed in the bearing of the support and its opposite end engaged within the bearings carried by the cross head and serving when expanded under the influence of a rising temperature of the flue gases to swing the rod toward the valve member, and a stop adjustably connected to the valve member for limiting the swinging movement of the thermostat assembly in a direction away from said member.

LEE S. CHADWICK.
MARC RESEK.
JOHN A. DAHLSTROM.